US011164146B2

(12) United States Patent
Curlee et al.

(10) Patent No.: US 11,164,146 B2
(45) Date of Patent: Nov. 2, 2021

(54) INVENTORY IDENTIFICATION

(71) Applicant: Dell Products L.P., Round Rock, TX (US)

(72) Inventors: James Don Curlee, Round Rock, TX (US); Steven Embleton, Austin, TX (US); Joshua Scott Keup, Austin, TX (US); Ben John Sy, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 217 days.

(21) Appl. No.: 16/681,410

(22) Filed: Nov. 12, 2019

(65) Prior Publication Data

US 2021/0142264 A1 May 13, 2021

(51) Int. Cl.
*G06Q 10/08* (2012.01)
*G06F 16/25* (2019.01)
*G06F 16/23* (2019.01)
*G06K 19/06* (2006.01)

(52) U.S. Cl.
CPC ....... *G06Q 10/087* (2013.01); *G06F 16/2365* (2019.01); *G06F 16/252* (2019.01); *G06K 19/06028* (2013.01); *G06K 19/06037* (2013.01)

(58) Field of Classification Search
None
See application file for complete search history.

(56) References Cited

U.S. PATENT DOCUMENTS

| 4,728,160 | A | 3/1988 | Mondor et al. |
|---|---|---|---|
| 5,298,681 | A | 3/1994 | Swift et al. |
| 5,897,180 | A | 4/1999 | Singer |
| 6,439,528 | B1 | 8/2002 | Goto et al. |
| 7,304,855 | B1 | 12/2007 | Milligan et al. |
| 7,551,971 | B2 | 6/2009 | Hillis |
| 7,556,271 | B2 | 7/2009 | Robbins et al. |
| 7,854,652 | B2 | 12/2010 | Yates et al. |
| 8,490,413 | B2 | 7/2013 | Blackway et al. |
| 9,423,001 | B2 | 8/2016 | Green et al. |
| 9,701,330 | B2 | 7/2017 | Mkandawire et al. |
| 9,732,979 | B2 | 8/2017 | Fadell et al. |
| 9,992,913 | B1 | 6/2018 | Czamara et al. |
| 10,093,450 | B2 | 10/2018 | Embleton et al. |
| 10,334,749 | B2 | 6/2019 | Eckberg et al. |
| 10,850,757 | B1 | 12/2020 | Curlee et al. |
| 2003/0041409 | A1 | 3/2003 | Caporale |
| 2006/0243690 | A1 | 11/2006 | Mollard |
| 2006/0288659 | A1 | 12/2006 | Scheid, Sr. et al. |

(Continued)

OTHER PUBLICATIONS

Affordable Display Products, Wood Chart File Wall Rack with 4 Pockets, https://www.affordabledisplayproducts.com/Display-Products/Medical-Chart-File-Holders-Hanging-File-Folder-Racks-Medical-Chart-Holders/CH14-2-Chart-File-Wall-Rack-Wood.

(Continued)

*Primary Examiner* — Paul Danneman

(74) *Attorney, Agent, or Firm* — Jackson Walker L.L.P.

(57) ABSTRACT

An apparatus may include an enclosure that includes a plurality of mounting features that are configured to receive information handling systems; an information handling resource configured to store and update a data structure that includes information regarding the information handling systems that are received in the enclosure; and a display configured to display inventory information for the enclosure based on the data structure.

20 Claims, 6 Drawing Sheets

(56) References Cited

U.S. PATENT DOCUMENTS

| | | |
|---|---|---|
| 2010/0243586 A1 | 9/2010 | Henderson et al. |
| 2011/0149508 A1 | 6/2011 | Malekmadani |
| 2011/0279973 A1 | 11/2011 | Terwilliger et al. |
| 2012/0104917 A1 | 5/2012 | Fan |
| 2012/0273438 A1 | 11/2012 | Nordin et al. |
| 2013/0032310 A1* | 2/2013 | Jaena .................. F28D 15/02 165/104.25 |
| 2015/0173253 A1 | 6/2015 | Lewis, II et al. |
| 2015/0186840 A1 | 7/2015 | Torres et al. |
| 2015/0334866 A1 | 11/2015 | Bailey et al. |
| 2016/0073547 A1 | 3/2016 | Maloney et al. |
| 2016/0107793 A1 | 4/2016 | Jiang et al. |
| 2016/0221716 A1 | 8/2016 | Embleton et al. |
| 2017/0223864 A1 | 8/2017 | Jost et al. |
| 2017/0257969 A1 | 9/2017 | Kuan et al. |
| 2017/0273212 A1 | 9/2017 | Davis et al. |
| 2017/0290193 A1 | 10/2017 | Franklin |
| 2018/0126896 A1 | 5/2018 | Embleton et al. |
| 2018/0127147 A1 | 5/2018 | Embleton et al. |
| 2019/0132976 A1 | 5/2019 | Clements et al. |

OTHER PUBLICATIONS

Caster Concepts, 5 Industries Where Shock Absorbing Caster Wheels are Perfect, Aug. 8, 2018, https://www.casterconcepts.com/industries-shock-absorbing-caster-wheels.

Crenlo, Emcor Defender Air Conditioned Server Rack Cabinets, https://www.crenlo.com/emcor/enclosures/datacom/server-cabinets/defender/.

Fernandez-Carames, Tiago M. and Fraga-Lamas, Paula, A Review on Human-Centered IoT-Connected Smart Labels for the Industry 4.0, May 7, 2018, IEEE Access, Special Section on Human-Centered Smart Systems and Technologies, vol. 6, 2018, pp. 25939-25957.

18U Open Frame 2 Post Server IT Network Data Rack HQ Relay on Casters Sysracks, https://www.amazon.com/Frame-Server-Network-Casters-Sysracks/dp/B079M19BXD.

Pelican-Hardigg Rack Mount Cases, https://www.pelican.com/us/en/professional/rack-mount-cases/.

RackLift RL5000E | 5000LB Server Cabinet Lifter, https://racklift.com/datacenter-products/racklift-rl5000e/.

ServerLift SL-500X Electric Lift, https://serverlift.com/data-center-lifts/sl-500x/.

Starcase, Elastomeric Isolation Mounts, https://www.starcase.com/Articles.asp?ID=256.

StepLift Ltd., Steplift's Server Management System, https://web.archive.org/web/20180428135226/https://www.steplift.com/server-management-system/.

* cited by examiner

INVENTORY IDENTIFICATION

TECHNICAL FIELD

The present disclosure relates in general to information handling systems, and more particularly to identification of inventory in the transportation of information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Various problems are known in the field of transportation and delivery of information handling systems, particularly in the enterprise context of rack-mounted systems including a plurality of standard-sized server information handling systems. Currently, integrated rack solutions are typically delivered to customers on a wooden pallet with foam (e.g., extruded polystyrene foam) to mitigate shock events. The shipping environment is extremely harsh, and integrated rack solutions can see significant forces, causing damage to the rack or the internal equipment.

This application is related to U.S. application Ser. No. 16/681,336, which is being filed concurrently and is incorporated by reference herein in its entirety. That application discusses in detail various embodiments of shippable "totes" that may be used as an all-in-one solution to dampen shock events via shock absorbers and/or isolators fully integrated into a server rack.

The present application addresses more specifically problems that may arise in inventory identification. Such problems may arise before, during, and/or after shipping such systems.

For example, at the time of delivery, if multiple racks of equipment are enclosed in a loading bay, it would be difficult to know how many systems and which particular systems are inside a given rack. This is especially the case when the customer pulls equipment incrementally over time.

As another example applicable to the time of build, packaging is currently applied at the end of the build process. Once equipment has been built and is stowed, labels are typically generated and applied to document what is in each box and where it is to be shipped. The packaging and labels are typically discarded after delivery.

The use of smart packaging techniques according to this disclosure may provide many benefits. It should be noted that for the sake of concreteness, this application describes the use of totes. However, one of ordinary skill in the art will appreciate its applicability to other designs as well.

It should also be noted that the discussion of a technique in the Background section of this disclosure does not constitute an admission of prior-art status. No such admissions are made herein, unless clearly and unambiguously identified as such.

SUMMARY

In accordance with the teachings of the present disclosure, the disadvantages and problems associated with identification of inventory in the transportation of information handling systems may be reduced or eliminated.

In accordance with embodiments of the present disclosure, an apparatus may include an enclosure that includes a plurality of mounting features that are configured to receive information handling systems; an information handling resource configured to store and update a data structure that includes information regarding the information handling systems that are received in the enclosure; and a display configured to display inventory information for the enclosure based on the data structure.

In accordance with these and other embodiments of the present disclosure, a method may include forming an enclosure that includes a plurality of mounting features that are configured to receive information handling systems; coupling an information handling resource to the enclosure, wherein the information handling resource is configured to store and update a data structure that includes information regarding the information handling systems that are received in the enclosure; and coupling a display to the enclosure, wherein the display is configured to display inventory information for the enclosure based on the data structure.

In accordance with these and other embodiments of the present disclosure, a method may include providing an enclosure that includes a plurality of mounting features that are configured to receive information handling systems; storing and updating a data structure at an information handling resource of the enclosure that includes information regarding the information handling systems that are received in the enclosure; and displaying, via a display of the enclosure, inventory information for the enclosure based on the data structure.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
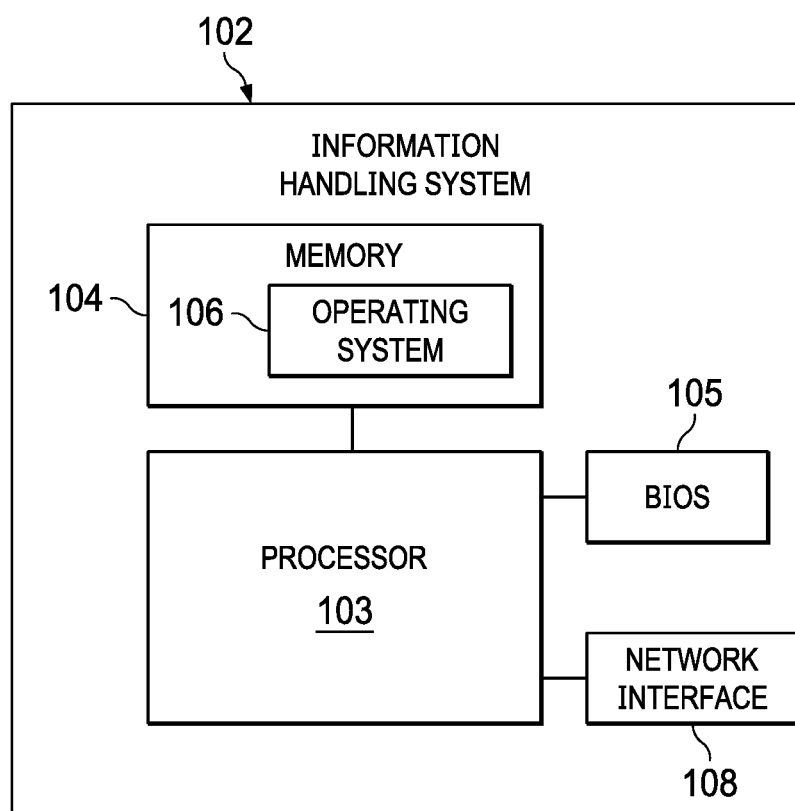
FIG. 1 illustrates a block diagram of an example information handling system, in accordance with embodiments of the present disclosure.

Preferred embodiments and their advantages are best understood by reference to FIGS. 1 through 4, wherein like numbers are used to indicate like and corresponding parts.

For the purposes of this disclosure, the term "information handling system" may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For purposes of this disclosure, when two or more elements are referred to as "coupled" to one another, such term indicates that such two or more elements are in electronic communication or mechanical communication, as applicable, whether connected directly or indirectly, with or without intervening elements.

When two or more elements are referred to as "couple-able" to one another, such term indicates that they are capable of being coupled together.

For the purposes of this disclosure, the term "computer-readable medium" (e.g., transitory or non-transitory computer-readable medium) may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; communications media such as wires, optical fibers, microwaves, radio waves, and other electromagnetic and/or optical carriers; and/or any combination of the foregoing.

For the purposes of this disclosure, the term "information handling resource" may broadly refer to any component system, device, or apparatus of an information handling system, including without limitation processors, service processors, basic input/output systems, buses, memories, I/O devices and/or interfaces, storage resources, network interfaces, motherboards, and/or any other components and/or elements of an information handling system.

FIG. 1 illustrates a block diagram of an example information handling system 102, in accordance with embodiments of the present disclosure. In some embodiments, information handling system 102 may comprise a server chassis configured to house a plurality of servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of physical disk drives and/or other computer-readable media for storing data (which may generally be referred to as "physical storage resources"). As shown in FIG. 1, information handling system 102 may comprise a processor 103, a memory 104 communicatively coupled to processor 103, a BIOS 105 (e.g., a UEFI BIOS) communicatively coupled to processor 103, a network interface 108 communicatively coupled to processor 103. In addition to the elements explicitly shown and described, information handling system 102 may include one or more other information handling resources.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 106. Operating system 106 may comprise any program of executable instructions (or aggregation of programs of executable instructions) configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network). Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

Network interface 108 may comprise one or more suitable systems, apparatuses, or devices operable to serve as an interface between information handling system 102 and one or more other information handling systems via an in-band network. Network interface 108 may enable information handling system 102 to communicate using any suitable transmission protocol and/or standard. In these and other embodiments, network interface 108 may comprise a network interface card, or "NIC." In these and other embodiments, network interface 108 may be enabled as a local area network (LAN)-on-motherboard (LOM) card.

As discussed above, various problems are known in the art of transportation and delivery of information handling systems (e.g., information handling system 102). Accordingly, a transportation apparatus referred to herein as a tote may be used as an all-in-one solution that dampens shock events via shock absorbers and/or isolators fully integrated into a server rack, having a ship loadable design. Such a tote may be made of any suitable material (e.g., steel).

Figure 2A:
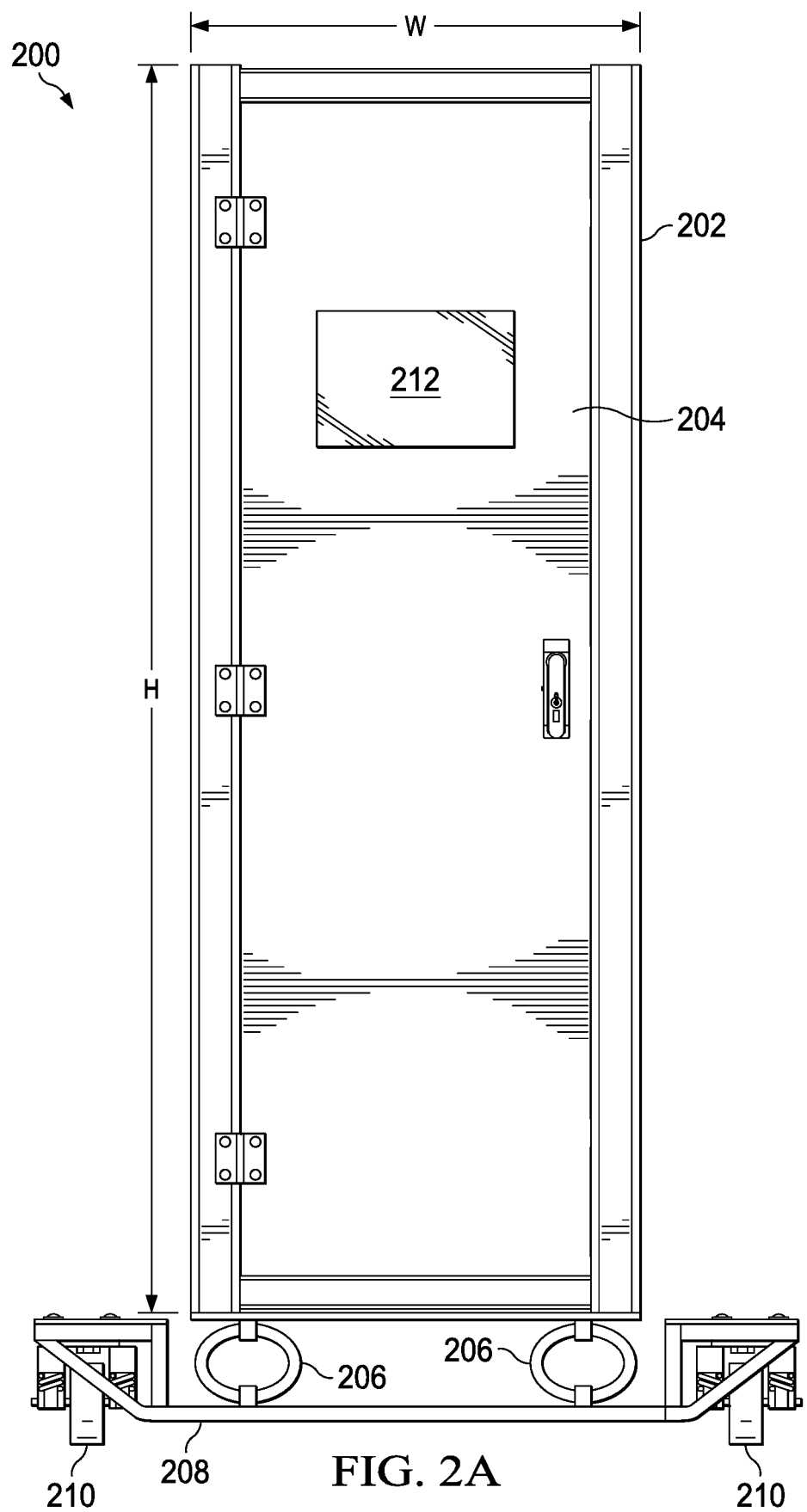
FIG. 2A illustrates a front view of an example transportation apparatus, in accordance with embodiments of the present disclosure.
Figure 2B:
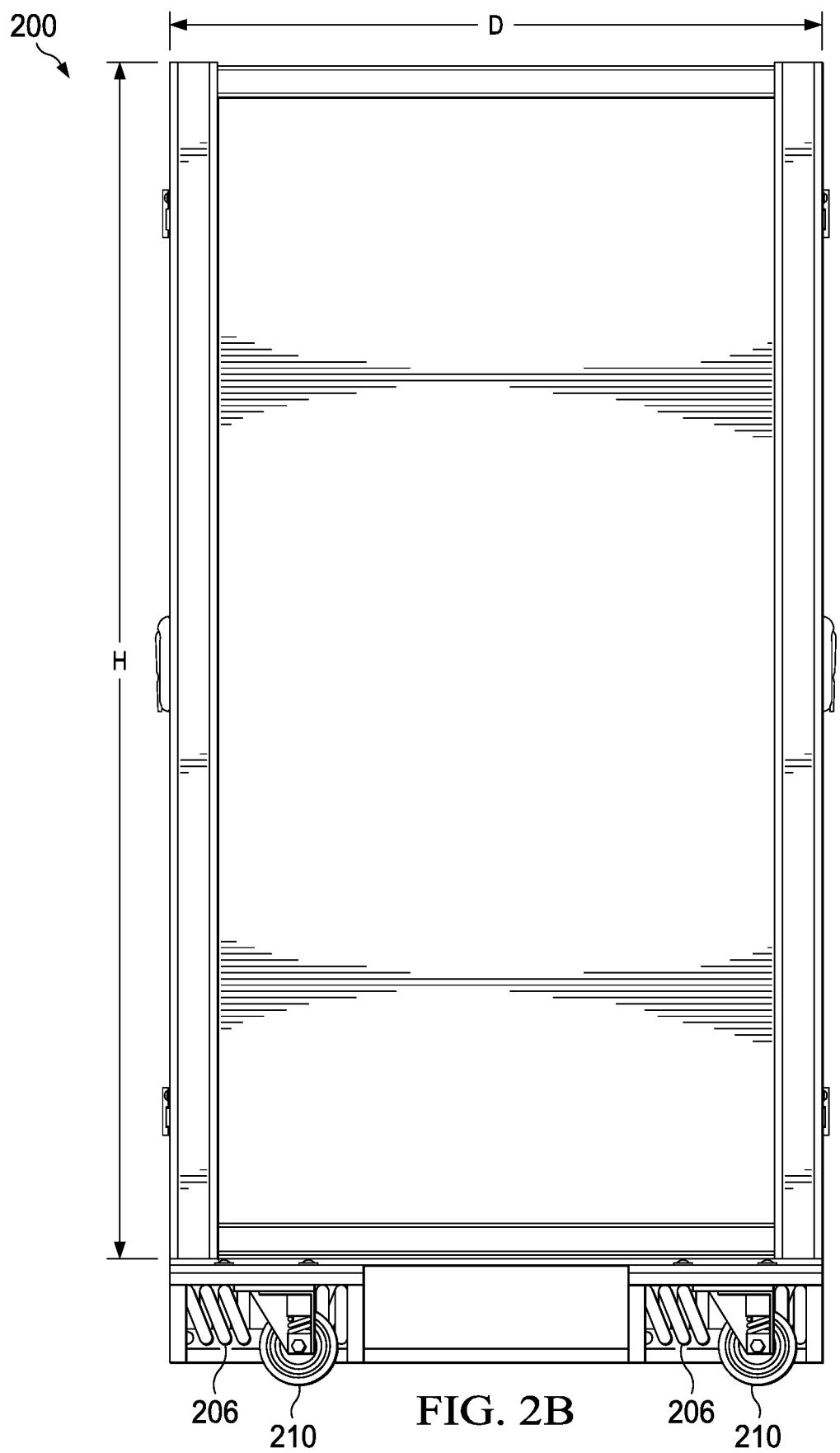
FIG. 2B illustrates a side view of the embodiment of FIG. 2A.
Figure 2C:
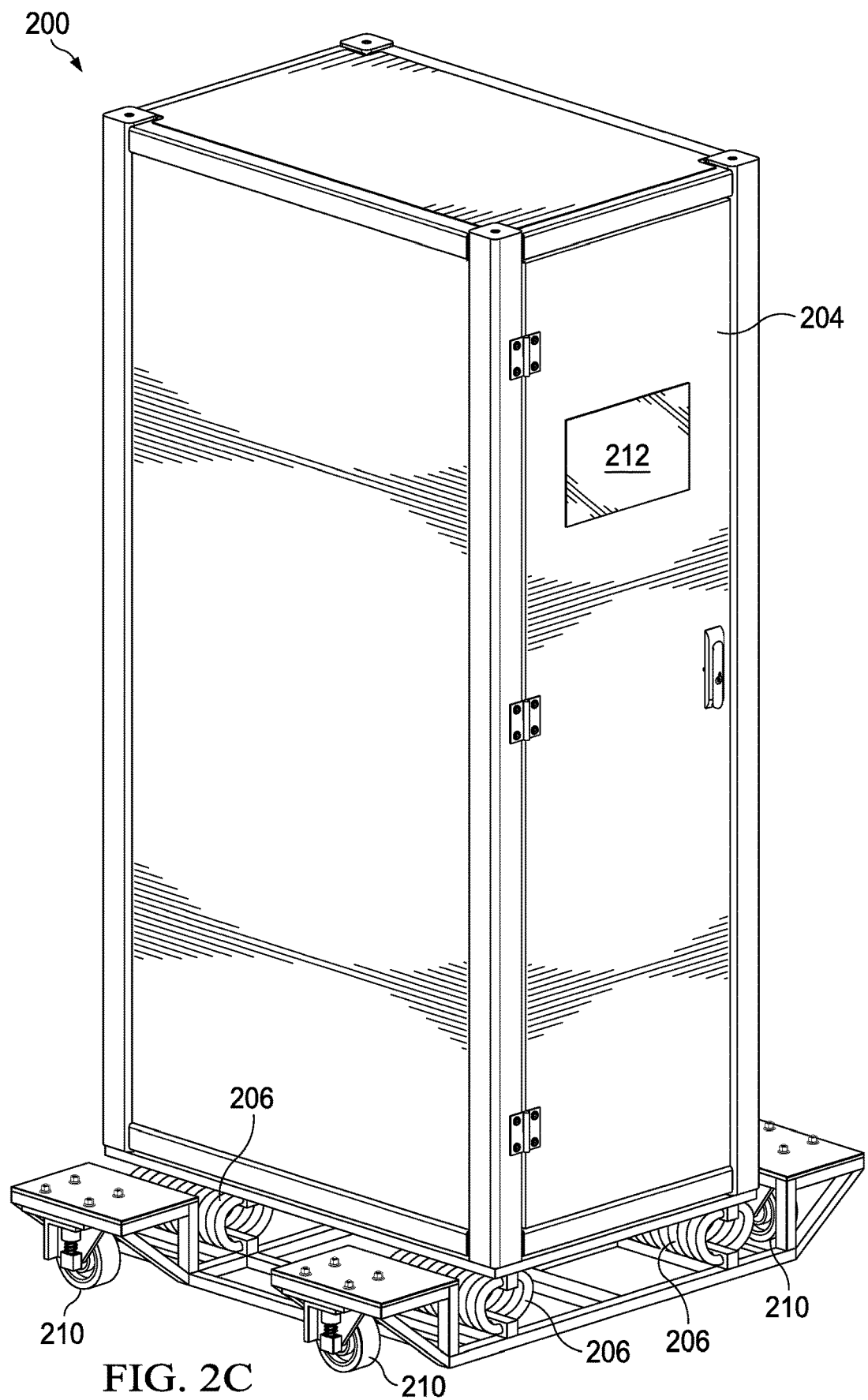
FIG. 2C illustrates a perspective view of the embodiment of FIG. 2A.

Turning now to FIGS. 2A-2C, several views are shown of an example tote 200. Tote 200 includes an enclosure portion 202 coupled on top of a base portion 208. Enclosure portion 202 may include a door 204 and a rack (not explicitly shown in these views) for receiving a plurality of information handling systems such as information handling system 102. In some embodiments, the rack may be manufactured according to a standard such as EIA-310, which defines standard rack unit sizing. For example, the embodiment shown at tote 200 may be sized to accommodate 40 rack units worth of information handling systems. In other embodiments, different sizes may be used such as 21-inch server equipment, laptops, desktops, other types of information handling systems, or information handling resources such as internet-of-things (IOT) hardware, hard drives, monitors, etc.

In some embodiments, tote 200 may be usable only for transport of information handling systems (e.g., it may not be configured for powering and operating such systems while they are received in the rack).

The rack may be isolated from vibrations during transit via the use of isolators 206. In various embodiments, isolators 206 may be wire rope, elastomeric, or any other suitable type of isolator. In the embodiment shown, isolators 206 are of the wire rope type. In some embodiments, tote 200 may also include lateral shock absorbers for protection from bumps that it may experience during integration and transportation (e.g., running into other racks, walls, truck walls, etc.).

Base portion 208 may also include casters 210 (e.g., four casters 210), which may be installed in an "outrigger" configuration. For example, enclosure portion 202 has a height H, a width W, and a depth D as shown. The width and the depth may define a footprint for enclosure portion 202, and casters 210 may be disposed in positions that are laterally displaced such that they reside outside of the footprint of enclosure portion 202. In the embodiment shown, casters 210 may be shock-absorbing casters. For example, they may have integral shock dampers and/or may be mounted on shock-damping mounts.

The outrigger configuration for casters 210 may provide additional stability, when compared to a configuration in which casters 210 are within the footprint of enclosure portion 202 (e.g., below enclosure portion 202). Further, the displacement of casters 210 along the width direction but not along the depth direction may allow for the total depth of tote 200 may be minimized, allowing for movement through narrow doors, elevators, etc. Further, the need for pallet jacks may be eliminated.

The configuration of casters 210 and isolators 206 shown may further allow tote 200 to have a reduced total height, easing travel in constrained spaces.

Figure 3:
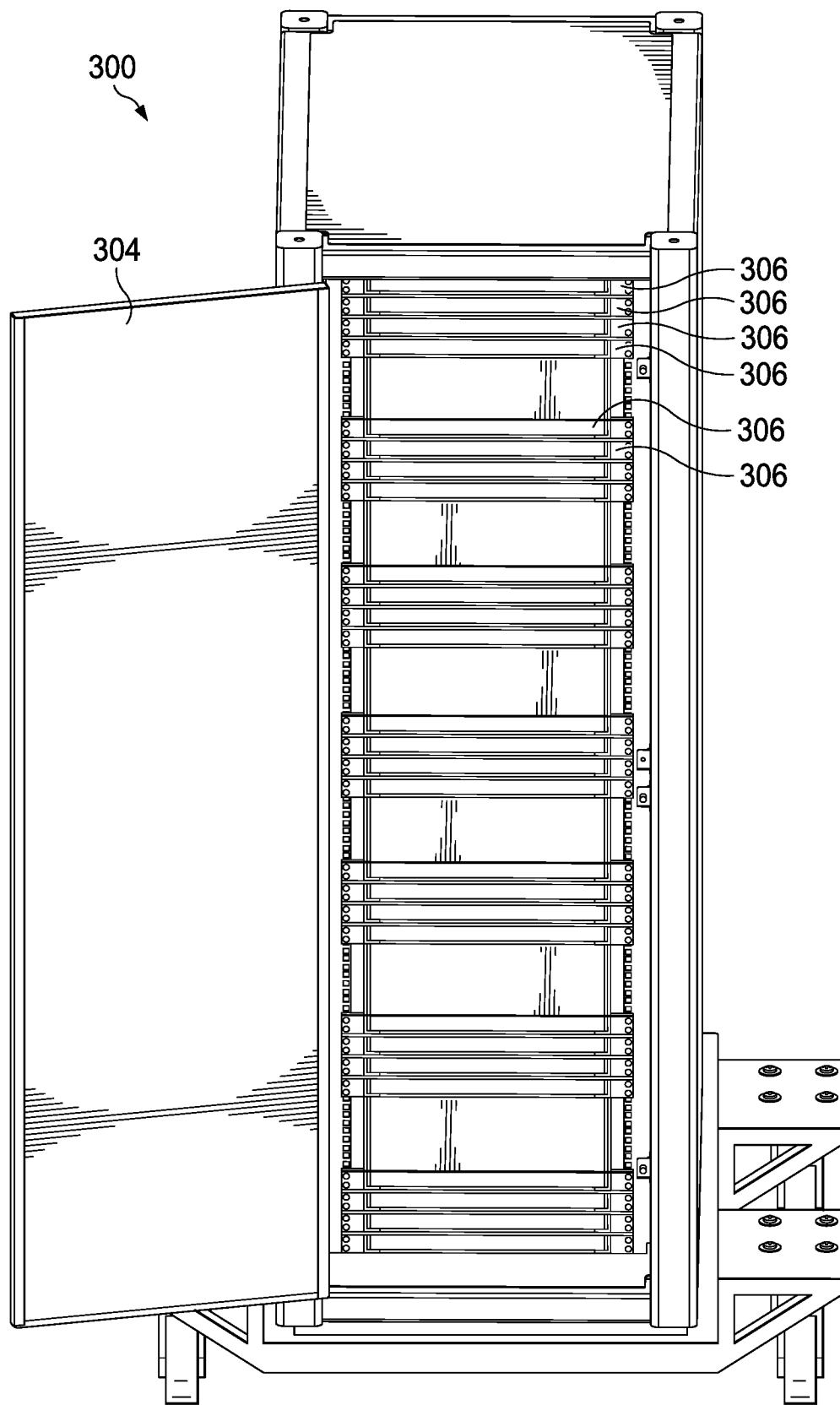
FIG. 3 illustrates a front view of another example transportation apparatus, in accordance with embodiments of the present disclosure.

FIG. 3 shows an embodiment of a similar tote 300, in which door 304 has been opened. As can be seen in this view, a plurality of mounting features 306 are disposed within the enclosure portion of tote 300. For example, mounting features may include rails, shelves, or any other suitable hardware for securely attaching and/or retaining information handling systems.

With reference back to FIGS. 2A-2C, tote 200 may also include display 212, which may be used for providing various types of information that may be useful before, during, and after shipping. Display 212 may be an LCD, an e-ink display, or any other suitable type of display. Display 212 may also include one or more integrated information handling resources (not shown separately) for reading sensor values, performing calculations, and the like. For example, display 212 may include a processor and a memory.

In operation, display 212 may function as a dynamic electronic label that displays relevant information (e.g., static and/or dynamic information). Static information may include data such as part numbers, QR codes, etc. Dynamic information may include data such as the number of systems present in the tote, the current weight, etc.

Weight may be estimated from spring deflection (e.g., deflection of isolators 206). For example, in some embodiments, isolators 206 may have one or more sensors attached thereto and communicatively coupled to display 212. The number of systems present in tote 200 may be inferred based on the measured weight, together with knowledge of the weight of the empty tote. One of ordinary skill in the art will understand that various other types of sensors may also be included and may provide inputs for display via display 212.

Display 212 may maintain and update a data structure based on the initial loading of systems into tote 200, the sensor readings, and any other relevant data that may indicate changes in the inventory inside tote 200. Such a data structure may be indicative of the number of systems remaining in the tote, the likely remaining part numbers, etc. The data structure may comprise a list, a map, a table, a database, and/or any other suitable data structure.

As one example, if it is known that a tote is populated with two different types of systems having different weights, then the exact changes in the weight measurements might give information about which systems have been removed and which remain.

Figure 4:
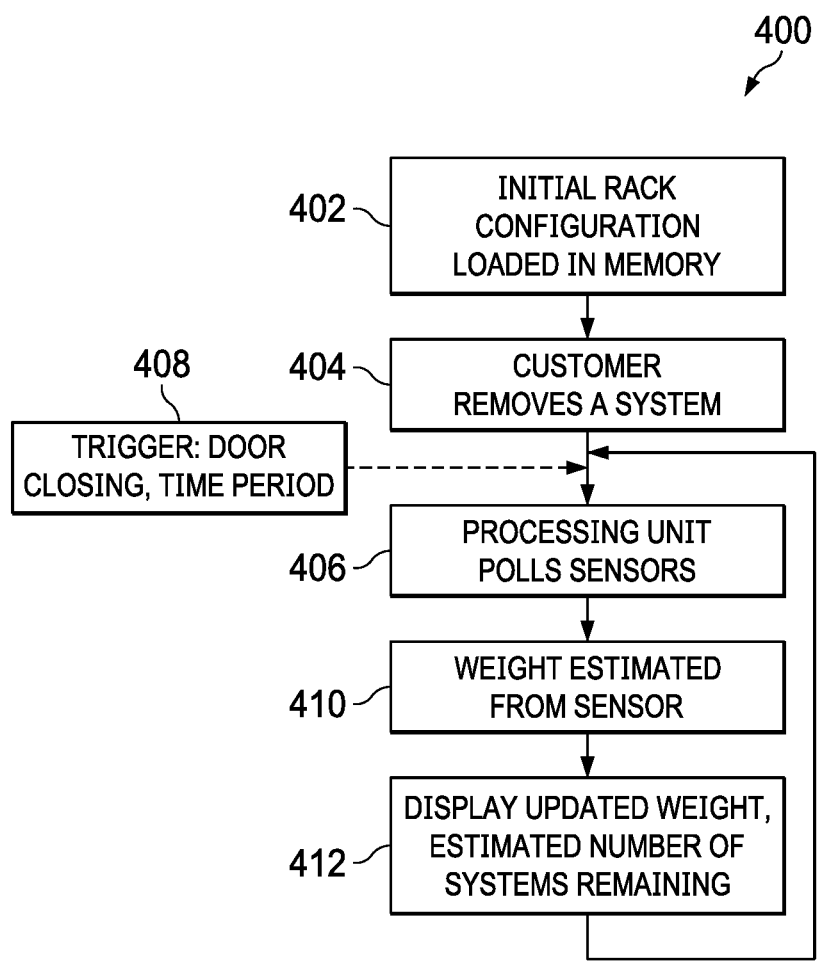
FIG. 4 illustrates a flow chart of an example method, in accordance with embodiments of the present disclosure.

Turning now to FIG. 4, an example method 400 for estimating the remaining inventory inside a tote is shown, in according with some embodiments. This method may be carried out by one or more information handling resources such as display 212 discussed above.

At step 402, the initial rack configuration is loaded into memory. For example, a memory associated with display 212 may be populated with information about the initial inventory inside a tote.

At step 404, the customer may remove a system from the tote.

At step 406, a polling loop may be entered. In some embodiments, this loop may be triggered at step 408 by an event such as a tote door closing, an expiration of a time period, etc.

During the polling loop, at step 410, the weight of the tote is estimated based on one or more sensor readings. At step

412, the display may be updated. For example, the display may provide a reading of the current weight. In some embodiments, the display may also provide an estimate for the current remaining inventory inside the tote.

After completion of step 412, the method may return to the beginning of the polling loop to continue to update the display.

One of ordinary skill in the art with the benefit of this disclosure will understand that the preferred initialization point for the method depicted in FIG. 4 and the order of the steps comprising that method may depend on the implementation chosen. In these and other embodiments, methods may be implemented as hardware, firmware, software, applications, functions, libraries, or other instructions. Further, although FIG. 4 discloses a particular number of steps to be taken with respect to the disclosed method, the method may be executed with greater or fewer steps than those depicted. The method may be implemented using any of the various components disclosed herein (such as the components of FIG. 1), and/or any other system operable to implement the method.

In various embodiments, display 212 (or some other display) may be used to implement other features as well. For example, even prior to shipping, it is advantageous to be able to display information on a tote. Currently, this is implemented via printed labels.

In some embodiments, display 212 may receive and send instructions. When a customer orders a rack, information may be sent to display 212, which may display a list of exactly what equipment is to be loaded (e.g., part numbers, quantities, etc.). Display 212 may then provide up-to-date information regarding the customer's order, the ship date, etc.

When the tote is ready to ship, display 212 may be updated to display all required shipping labels. It may also display the weight, footprint, and any other useful shipping information.

When the tote is being loaded onto a truck, display 212 may identify its location within the truck and indicate whether the mass is properly centered.

During integration and transit, display 212 may send messages back to the manufacturer to indicate status, load, location, etc. This may allow for automated tracking of materials, in some embodiments even real-time tracking (e.g., if a cellular modem is included with display 212).

Once the tote is on site at the customer's datacenter, display 212 may be updated to display customer-specific information such as any labels required by the customer to indicate the equipment, quantities, etc. Display changes such as this may be triggered by circuitry (e.g., a GPS receiver) that indicates the location of the tote and updates display 212 with such information.

Further, display 212 may display the layout of the tote, illustrating equipment labels and locations within tote. In some embodiments, display 212 may even display service manuals and the like for equipment in the tote.

As discussed above, display 212 may be configured to determine what equipment has been removed. If the customer is replacing existing equipment, then that equipment may be loaded into the tote for shipping back to the manufacturer. Such equipment may be logged into the tote via display 212 (e.g., via a bar code, a QR code, manual entry, etc.). Thus display 212 may keep an accurate account of what equipment is inside the tote. This information may be communicated to the manufacturer when the tote is shipped back.

Although various possible advantages with respect to embodiments of this disclosure have been described, one of ordinary skill in the art with the benefit of this disclosure will understand that in any particular embodiment, not all of such advantages may be applicable. In any particular embodiment, some, all, or even none of the listed advantages may apply.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Further, reciting in the appended claims that a structure is "configured to" or "operable to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke § 112(f) during prosecution, Applicant will recite claim elements using the "means for [performing a function]" construct.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. An apparatus comprising:
   an enclosure that includes a plurality of mounting features that are configured to receive information handling systems;
   an information handling resource configured to store and update a data structure that includes information regarding the information handling systems that are received in the enclosure; and
   a display configured to display inventory information for the enclosure based on the data structure.

2. The apparatus of claim 1, wherein the enclosure and the mounting features are sized to receive information handling systems that conform to standardized rack unit sizes.

3. The apparatus of claim 1, wherein:
   the enclosure is further configured to receive information handling resources; and
   the data structure further includes information regarding the information handling resources that are received in the enclosure.

4. The apparatus of claim 1, wherein the display is further configured to:
   display a first set of information while the apparatus is in a first location; and based on the apparatus being moved to a second location, display a second set of information.

5. The apparatus of claim 1, wherein the information handling resource is further configured to:
monitor a weight of the apparatus; and
update the data structure based on changes in the weight.

6. The apparatus of claim 5, wherein the weight is monitored based on an amount of deflection associated with a shock absorber or a vibration isolator of the apparatus.

7. The apparatus of claim 1, wherein the information handling resource is further configured to:
receive information indicative of a bar code and/or a QR code indicating that a particular information handling system has been added to or removed from the enclosure; and
update the data structure based on the particular information handling system.

8. The apparatus of claim 1, wherein the display is an e-ink display.

9. The apparatus of claim 1, wherein the display is further configured to display location information for the information handling systems received within the enclosure.

10. The apparatus of claim 1, wherein the apparatus further comprises a door, and wherein the updating the data structure is based on an indication that the door has been opened.

11. The apparatus of claim 1, wherein the apparatus is configured for transportation of the information handling systems, but is not configured to allow for operation of the information handling systems while the information handling systems are received therein.

12. The apparatus of claim 1, wherein the information handling resource includes a processor and a memory.

13. A method comprising:
forming an enclosure that includes a plurality of mounting features that are configured to receive information handling systems;
coupling an information handling resource to the enclosure, wherein the information handling resource is configured to store and update a data structure that includes information regarding the information handling systems that are received in the enclosure; and
coupling a display to the enclosure, wherein the display is configured to display inventory information for the enclosure based on the data structure.

14. The method of claim 13, wherein the enclosure and the mounting features are sized to receive information handling systems that conform to standardized rack unit sizes.

15. The method of claim 13, further comprising:
displaying a first set of information while the enclosure is in a first location; and
based on the enclosure being moved to a second location, displaying a second set of information.

16. The method of claim 13, further comprising:
monitoring a weight of the enclosure; and
updating the data structure based on changes in the weight.

17. The method of claim 16, wherein the weight is monitored based on an amount of deflection associated with a shock absorber or a vibration isolator of the enclosure.

18. The method of claim 13, further comprising:
receiving information indicative of a bar code and/or a QR code indicating that a particular information handling system has been added to or removed from the enclosure; and
updating the data structure based on the particular information handling system.

19. The method of claim 13, wherein the enclosure further comprises a door, and wherein the updating the data structure is based on an indication that the door has been opened.

20. A method comprising:
providing an enclosure that includes a plurality of mounting features that are configured to receive information handling systems;
storing and updating a data structure at an information handling resource of the enclosure that includes information regarding the information handling systems that are received in the enclosure; and
displaying, via a display of the enclosure, inventory information for the enclosure based on the data structure.

* * * * *